(12) United States Patent
Bigler et al.

(10) Patent No.: US 6,570,621 B2
(45) Date of Patent: May 27, 2003

(54) LENS CAP DETECTION

(75) Inventors: Larry R. Bigler, Windsor, CO (US); Jerry W. Swinford, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/862,756

(22) Filed: May 21, 2001

(65) Prior Publication Data

US 2002/0171756 A1 Nov. 21, 2002

(51) Int. Cl.[7] .................. H04N 5/225; H04N 5/222; G03B 3/10; G03B 17/00
(52) U.S. Cl. .............. 348/372; 348/373; 348/333.13; 396/100; 396/448
(58) Field of Search .................. 396/448, 268, 396/281, 60, 70, 100; 348/333.04, 335, 372, 333.13, 373

(56) References Cited

U.S. PATENT DOCUMENTS

| | | | | |
|---|---|---|---|---|
| 4,349,266 A | * | 9/1982 | Maeda | 396/544 |
| 4,410,253 A | * | 10/1983 | Tsuboi | 396/448 |
| 4,432,627 A | * | 2/1984 | Mizokami | 396/281 |
| 4,990,944 A | * | 2/1991 | Yamamoto | 396/281 |
| 5,570,231 A | * | 10/1996 | Mogamiya | 359/640 |
| 5,666,568 A | * | 9/1997 | Saito | 396/100 |
| 5,678,092 A | * | 10/1997 | Kim | 396/287 |
| 5,815,316 A | | 9/1998 | Friedman et al. | 359/511 |
| 5,848,303 A | * | 12/1998 | Jeong | 396/65 |
| 5,920,342 A | * | 7/1999 | Umeda | 348/211 |
| 6,052,536 A | * | 4/2000 | Arai | 396/100 |
| 6,111,609 A | * | 8/2000 | Stevens | 348/372 |
| 2001/0012071 A1 | * | 8/2001 | Oeda | 348/333.01 |

* cited by examiner

Primary Examiner—Wendy R. Garber
Assistant Examiner—Lin Ye

(57) ABSTRACT

A lens cap detection system and method for an image capturing device are provided according to the invention. The lens cap detection system in one embodiment includes a lens apparatus and a lens cap detector that is capable of detecting the presence of a lens cap on the lens apparatus and outputting a signal indicative thereof. The lens cap detection system further includes a processor that communicates with the lens cap detector. The processor generates an alert if the lens cap is detected by the lens cap detector, and does not generate an alert if the lens cap is not detected.

20 Claims, 2 Drawing Sheets

LENS CAP DETECTION

FIELD OF THE INVENTION

The present invention relates generally to electronic image capturing devices, and more particularly to lens cap detection for an image capturing device with a movable lens.

BACKGROUND OF THE INVENTION

Image capturing devices are used to visually memorialize scenes, events, or items. A common image capturing device is a camera. Cameras include both still and video cameras, and may capture images using either analog or digital technology. They commonly use a lens apparatus to admit light reflected from the image of interest and focus it onto some sort of image capturing apparatus, such as a CCD array or a photosensitive film. The lens apparatus is therefore a critical component of the camera, and must be protected from damage in order to maintain image quality.

Most modern cameras include a processor and/or other control electronics that function to control shutter speed, aperture, flash, focus, etc. In addition, a camera may include one or more user input devices that allows a user to turn the camera on and off, select settings, capture images, select flashes, zoom in or out, etc.

The lens in a camera may be movable, and is typically extended upon power-up of the camera. A first type of movable lens is a lens or lens device that retracts at least partially into the camera body. This may be done in order to protect the lens and minimize the size of the camera when not in use. Another type of movable lens is a zoom lens, through which the user may change the focal depth of the camera. A camera having a zoom lens may additionally retract the zoom lens when going into a power-down state.

Because the lens is an expensive optical instrument that must be protected, most cameras employ some form of lens cover that fits over the lens to keep out dust and prevent the lens from getting scratched or damaged. However, in many cameras having a movable lens, the lens apparatus is typically moved to a default position upon power up, i.e., when the user turns the camera on. If the lens cap is not removed prior to the power up and extension of the lens device, the lens drive motor could be damaged. In addition, the lens may contact the lens cap and damage the lens. Furthermore, the blocked zoom lens may draw excessive current, which will shorten battery life. Finally, pictures cannot be taken with the lens cap on.

The prior art approach to this problem is simply to leave it to the user to remember to remove the lens cap prior to turning on the camera to a powered-up state. However, because of the high level of automation in modern cameras, this is unacceptable for the reasons explained above.

Therefore, there remains a need in the art for improvements in image capturing devices having movable lenses.

SUMMARY OF THE INVENTION

A lens cap detection system for an image capturing device is provided according to one preferred embodiment of the invention. The lens cap detection system comprises a lens apparatus and a lens cap detector that is capable of detecting the presence of a lens cap on the lens apparatus and outputting a signal indicative thereof. The lens cap detection system further includes a processor that communicates with the lens cap detector. The processor generates an alert if the lens cap is detected by the lens cap detector, and does not generate an alert if the lens cap is not detected.

According to another embodiment of the invention, the lens cap detection system comprises an electronic imaging device lens cap detector that measures a level of light received in the image capturing device through the movable lens apparatus and generates a light level measurement. The lens cap detection system further comprises a memory storing a predetermined light threshold value. The lens cap detection system further comprises a processor that receives a light level measurement from the electronic imaging device lens cap detector, compares the light level measurement to the stored predetermined light threshold value, and controls the lens drive motor to extend the movable lens apparatus if the light level measurement is greater than the predetermined light threshold value. The processor controls the lens drive motor to remain inoperative if the light level measurement is less than or equal to the threshold.

According to yet another embodiment of the invention, a computer-implemented lens extension method for moving the lens of an image capturing device is provided. The method comprises the step of detecting a lens cap on a retracted movable lens apparatus of the image capturing device. The detection is performed by a lens cap detector and a processor of the image capturing device. The method further comprises the step of extending the movable lens apparatus if the lens cap is not detected and maintaining the movable lens apparatus in a retracted state if the lens cap is detected. The extending step of the movable lens apparatus is controlled by the processor.

DETAILED DESCRIPTION

Figure 1:
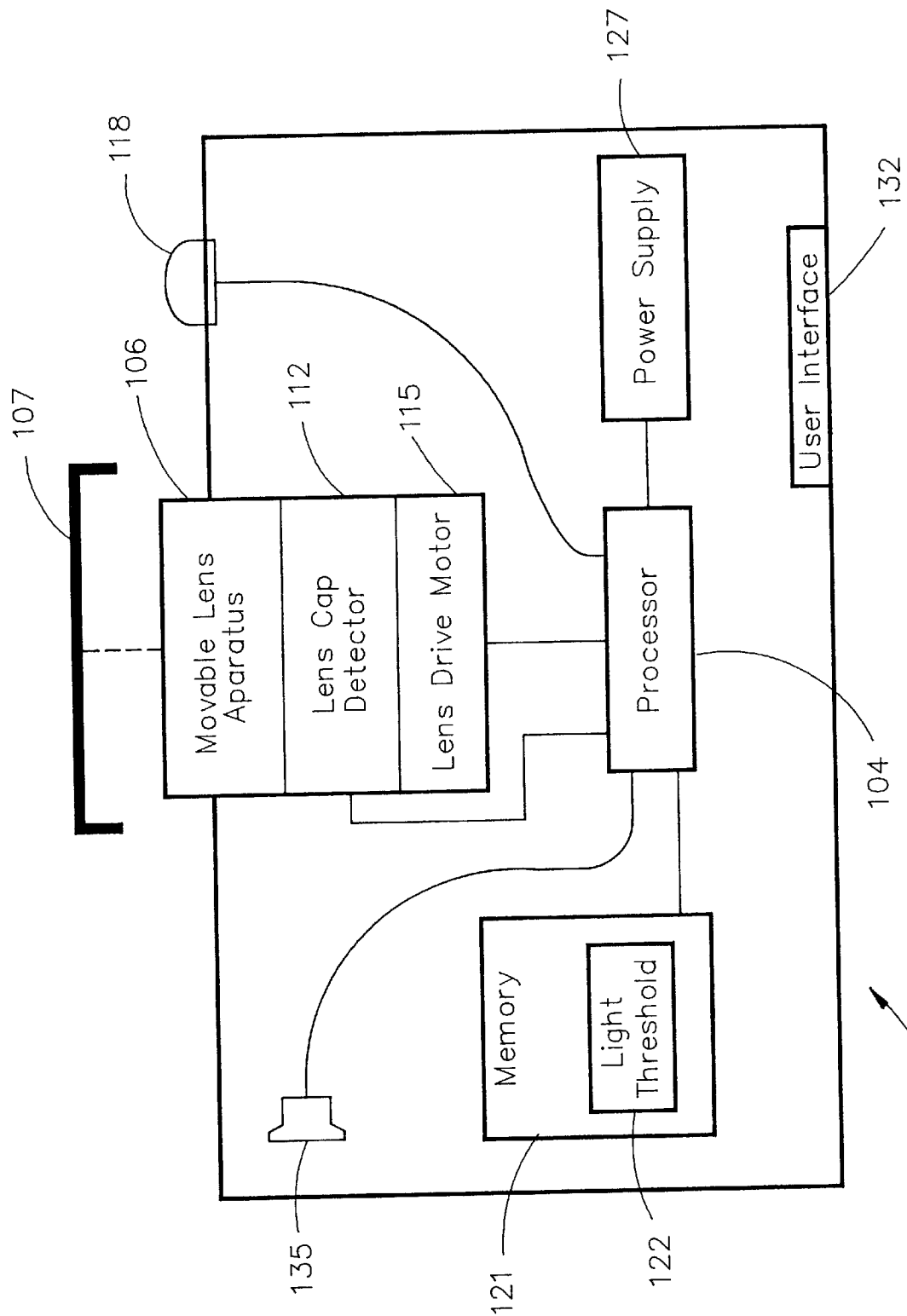
FIG. 1 shows an image capturing device employing a lens cap detection apparatus according to one embodiment of the invention.

FIG. 1 shows an image capturing device 100 employing a lens cap detection apparatus according to one preferred embodiment of the invention. The image capturing device 100 may be an analog or digital still camera or video camera, for example. The image capturing device 100 may include a movable lens apparatus 106 and a lens cap 107. In addition, the image capturing device 100 may include a lens cap detector 112, a lens drive motor 115, a processor 104, a memory 121, a power supply 127, an optional user interface 132, one or more input buttons 118, and an optional sound output device 135. The lens cap 107 may be placed over the movable lens apparatus 106 to protect it.

The memory 121 may be any type of memory, including all types of random access memory (RAM), read-only memory (ROM), magnetic storage media such as magnetic disc, tape, etc., or optical or bubble memory. The memory 121 may store, among other things, a predetermined light threshold 122 that is used by the processor 104 to detect whether the lens cap 107 is in place on the movable lens apparatus 106. In addition, the memory 121 may store a software program to be executed by the processor 104.

The predetermined light threshold may be stored in the memory 121, and may be preset at the factory during manufacture. In addition, the predetermined light threshold may optionally be user adjustable, such as through a user input. For example, the user may employ the user interface 132 to change the predetermined light threshold to a desired value, based on an ambient light level. The user may even be able to defeat or disable the lens cap detection, if desired.

This may be done by lowering the predetermined light threshold or by de-selecting the lens detection feature.

The processor 104 may be any type of general purpose processor. The processor 104 receives power from the power supply 127 and communicates with the memory 121 and with the lens cap detector 112 and controls the lens drive motor 115. The processor 104 controls the activation of the lens drive motor 115 in order to extend or retract the movable lens apparatus 106.

In use, the lens cap detector 112 detects whether the lens cap 107 is present and provides the result to the processor 104. If the lens cap detector 112 produces a signal that indicates that the lens cap 107 has not been removed, the processor 104 will not extend the movable lens apparatus 106. In addition, the processor 104 may generate a warning to the user and wait for the user to manually verify that the lens cap has been removed. Upon such verification, the processor 104 may extend the movable lens apparatus 106. This verification step may be necessary in low light settings where a light sensitive lens cap detector 112 does not receive enough light to reliably detect whether the lens cap 107 has been removed.

The warning may be in the form of a visual warning message, an audible warning message, etc. The visual warning message may be displayed on a display device of the image capturing device 100, such as the user interface 132, and may include an LCD display, an LED display, etc. The visual warning message may be a textual or iconic warning that prompts the user to check for the lens cap 107 and verify that it has been removed. The verification is achieved when the user enters a user verification input.

The audible warning message may comprise a tone, beep, etc., or a voice message. The audible warning message may be produced by a sound output device 135, such as a speaker or other sound transducer. The audible warning message may signal to the user that the lens cap 107 has not been removed. If the audible warning message is a voice message, it may instruct the user to remove the lens cap 107 and enter the user verification input.

The user verification input may be accepted through any input device, such as the input button 118. The input button 118 may be a specialized button or may perform other functions, such as a mode button, for example. Alternatively, the user interface 132 may contain buttons or touch-sensitive regions for accepting user inputs. If the image capturing device 100 includes a microphone (not shown) and a voice recognition capability, the user may even be able to provide a verbal user verification input.

In one embodiment, the lens cap detector 112 is an electronic imaging device, such as a CCD array or a CMOS array, for example. In this embodiment, the image capturing device 100 may be a digital still camera or digital video camera. The electronic imaging device 112 outputs a plurality of voltage levels (i.e., a light level measurement) related to the amount of light being received through the movable lens apparatus 106. Therefore, if the lens cap 107 has not been removed, the electronic imaging device 112 receives virtually no light. The processor 104 may digitize the light level measurement. The processor 104 compares the light level measurement from the electronic imaging device 112 to the predetermined light threshold value 122 in the memory 121. The predetermined light threshold represents the maximum amount of light that the lens cap detector 112 should receive when the lens cap 107 is on. Therefore, the processor 104 may be able to determine whether to extend the movable lens apparatus 106 as part of a power-up routine. This is true whether the movable lens apparatus 106 is a zoom lens apparatus or a retractable lens apparatus.

In another embodiment, the lens cap detector 112 may be a photo diode, photocell, or other light sensitive analog device. The light sensitive lens cap detector 112 according to this embodiment may be formed into an outer surface of the image capturing device 100 and may be located adjacent to the movable lens apparatus 106 as an alternative to being located behind the lens apparatus 106, as shown in FIG. 1. In such an embodiment, the detector 112 would be covered by the lens cap 107 when placed over the lens 106. Alternatively, the detector 112 may be internally located and may receive light through the movable lens apparatus 106.

The light sensitive lens cap detector 112 may generate a simple electronic output related to the received light. For example, the light sensitive device 112 may output a substantially non-zero voltage value if the light is above a predetermined threshold and output a substantially zero voltage value otherwise. This embodiment may be employed not only in digital still or video cameras, but may also be employed in analog still and video cameras. A digital camera may employ the light sensitive device 112 in addition to an electronic imaging device, such as a CCD array.

In a third embodiment, the lens cap detector 112 is a Hall effect sensor embedded in the image capturing device 100. The Hall effect sensor 112 detects the presence of one or more magnets (not shown) formed as part of the lens cap 107. This embodiment may be employed not only in digital still or video cameras, but may also be employed in analog still and video cameras.

In a fourth embodiment, the lens cap detector 112 is a mechanical switch. The switch 112 may measure a displacement or pressure due to the lens cap 107 when it is installed. The switch 112 is contacted by the lens cap 107 when the lens cap 107 is positioned on the movable lens apparatus 106. This embodiment may be employed in digital still or video cameras and in analog still and video cameras.

Although the above discussion advantageously applies to an image capturing device 100 employing a movable lens apparatus, the lens cap detection according to the invention may also be advantageously employed in an image capturing device having a fixed lens. In a fixed lens image capturing device embodiment, the image capturing device 100 includes a fixed lens apparatus 106, the lens cap detector 112, and the processor 104, and may include other components as previously recited. In the fixed lens device, if the lens cap 107 is detected, the processor 104 may generate an alarm to notify the user and may accept a user verification input, as previously discussed. In cameras having an on/off power switch, such as is common in digital still cameras and video cameras, the lens cap detection may be performed at a power-up time, for example. In cameras that do not have an on/off power switch, the lens cap detection may be performed upon manipulation of an input device, such as pressing the shutter button, for example.

Figure 2:
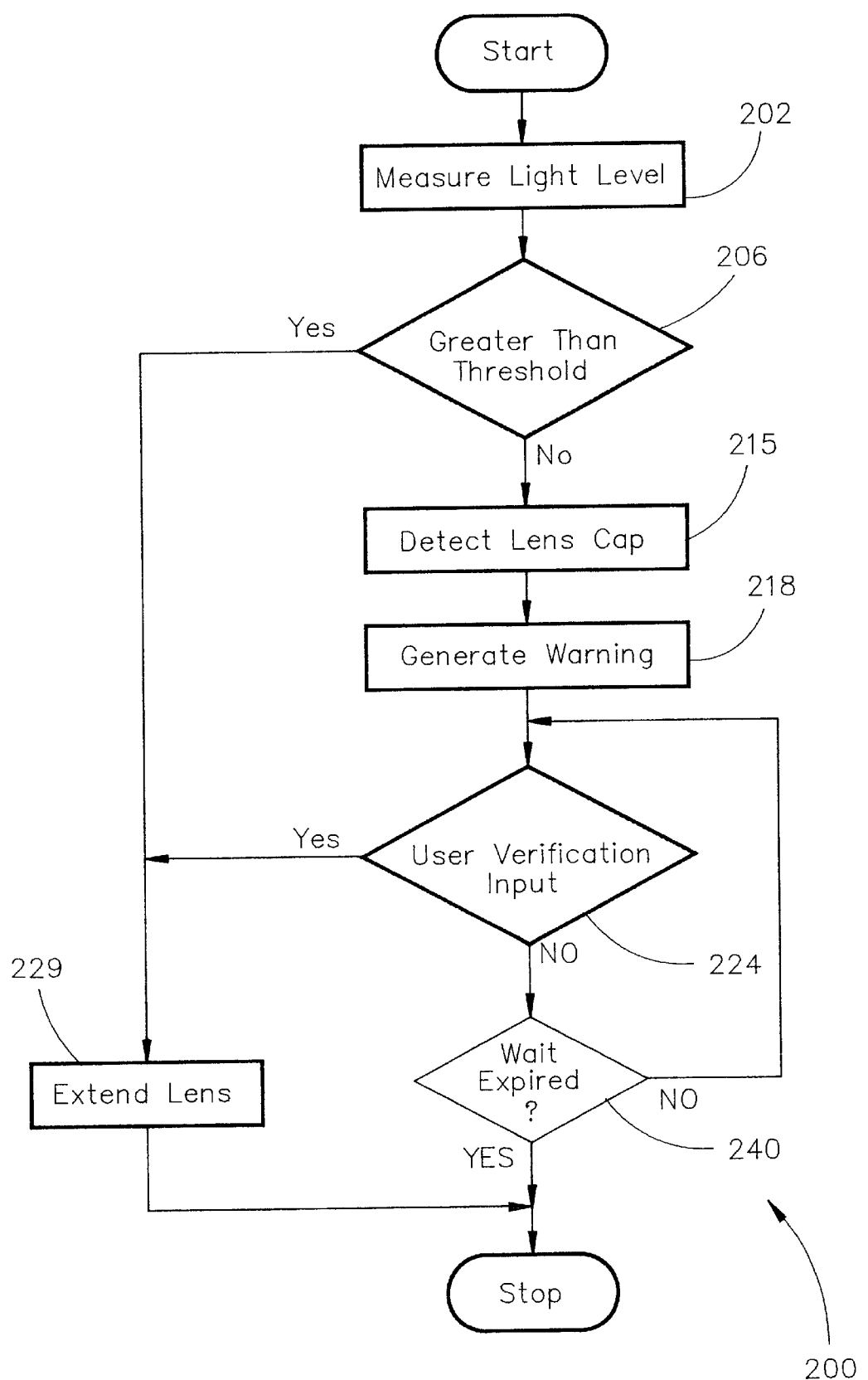
FIG. 2 is a flowchart of a movable lens extension method according to one embodiment of the invention.

FIG. 2 is a flowchart 200 of a movable lens extension method according to one embodiment of the invention. In step 202, the light level of light received in the image capturing device 100 is measured and a light level measurement is generated. The light level measurement may be performed by an electronic imaging device lens cap detector 112, such as a CCD array or a CMOS array, for example. Alternatively, it may be measured by a light sensitive device 112 such as a photo diode, photocell, or other light sensitive analog device.

In step 206, the light level measurement is compared to a predetermined light threshold. The predetermined light threshold may be programmed into the memory 121 of the image capturing device 100. In addition, the user may be able to adjust the predetermined light threshold, optionally including lowering the predetermined light threshold to a level where the lens cap detection is effectively disabled. If the light level measurement exceeds the predetermined light threshold, the method branches to step 229, else it proceeds to step 215. It should be noted that although the method is described as detecting the presence of the lens cap 107, alternatively the method may be viewed as detecting an absence of the lens cap 107.

In step 215, the lens cap 107 is detected as a result of the comparison, and the movable lens apparatus 106 is not extended.

In step 218, a warning is generated. The warning may be visual or audible, and may warn the user of the detected presence of the lens cap 107. In addition, the warning may instruct the user to enter a verification input to confirm that the lens cap 107 has been removed.

In step 224, a user verification input is accepted. If the user verification input is received, the method proceeds to step 229, else the method branches to step 240.

In step 240, the method checks a predetermined wait time. If the predetermined wait time has expired, the method exits; else it branches back to step 224.

In step 229, the movable lens apparatus 106 is extended.

In one alternative method embodiment, steps 202 and 206 may be replaced by detecting one or more magnets formed in the lens cap. In another alternative method embodiment, the lens cap 107 may be detected by determining a state of a switch that is contacted or obstructed by the lens cap 107 when the lens cap 107 is positioned on the movable lens apparatus 106.

It should be understood that although the lens cap detection system and method are mainly described for an image capturing device having a movable lens apparatus, the system and method may apply to any image capturing device employing a lens cap and capable of processing a lens cap detection signal. The system and method may therefore apply to all types of analog and digital still and video cameras having internal processors, for example.

We claim:

1. A lens cap detection system for an image capturing device, comprising:
    a movable lens apparatus having an extendable lens;
    a lens cap detector that detects light entering into said extendable lens and outputting a signal indicative of the magnitude thereof; and
    a processor communicating with said lens cap detector and controlling said movable lens apparatus;
    wherein said processor controls said movable lens apparatus to extend said extendable lens in response to an actuation signal from a user so long as the magnitude of light detected by said lens cap detector as indicated by said signal is above a predetermined threshold, indicating the absence of a lens cap on said extendable lens, and does not allow said extendable lens to be extended so long as said magnitude as indicated by said signal is not above said predetermined threshold, indicating the presence of a lens cap on said extendable lens.

2. The lens cap detection system of claim 1, further comprising a lens drive motor controlled by said processor, wherein said movable lens apparatus is moved by said lens drive motor.

3. The lens cap detection system of claim 1, wherein said lens cap detector is an electronic imaging device.

4. The lens cap detection system of claim 1, wherein said lens cap detector is a light sensitive device.

5. The lens cap detection system of claim 1, wherein said lens cap detector is a Hall effect sensor that is capable of detecting a magnet formed as part of said lens cap.

6. The lens cap detection system of claim 1, wherein said lens cap detector is a switch.

7. The lens cap detection system of claim 1, wherein said image capturing device further includes at least one display and a visual message is generated on said at least one display if said processor generates said alert.

8. The lens cap detection system of claim 1, wherein said image capturing device further includes at least one user input device whereby a user can confirm that said lens cap has been removed via said at least one user input device.

9. The lens cap detection system of claim 1, wherein said lens cap detector is an electronic imaging device lens cap detector that measures a level of light received in said image capturing device through said lens apparatus and generates a light level measurement, said detection system further comprising:
    a lens drive motor controlled by said processor; and
    a memory storing a predetermined light threshold value;
    wherein said lens apparatus comprises a movable lens apparatus that is moved by said lens drive motor and wherein said processor receives said light level measurement from said electronic imaging device lens cap detector, compares said light level measurement to said predetermined light threshold value, and controls said lens drive motor to extend said lens apparatus if said light level measurement is greater than said predetermined light threshold value.

10. A lens cap detection system for an image capturing device, comprising:
    a lens drive motor;
    a movable lens apparatus that is moved by said lens drive motor;
    an electronic imaging device lens cap detector that measures light received in a lens of said movable lens apparatus and generates a light level measurement indicative of a level of said measured light;
    a memory storing a predetermined light threshold value; and
    a processor communicating with said memory and with said electronic imaging device lens cap detector and controlling said lens drive motor;
    wherein said processor receives said light level measurement from said electronic imaging device lens cap detector, compares said light level measurement to said predetermined light threshold, and controls said lens drive motor to extend said movable lens apparatus so long as said light level measurement is greater than said predetermined light threshold, and controls said lens drive motor to remain inoperative so long as said light level measurement is less than or equal to said threshold.

11. The lens cap detection system of claim 10, wherein said image capturing device further includes at least one display and a visual message is generated on said at least one display if said light level measurement is not greater than said predetermined light threshold.

12. The lens cap detection system of claim 10, wherein said image capturing device further includes at least one user input device and a user can confirm that said lens cap has been removed via said at least one user input device.

13. A computer-implemented lens extension method for extending a retracted movable lens apparatus of an image capturing device, comprising the steps of:

detecting a lens cap on said retracted movable lens apparatus of said image capturing device by detecting light entering into a lens of said movable lens apparatus and comparing a detected amount of said light with a predetermined threshold;

extending said movable lens apparatus if said lens cap is not detected, so long as said detected amount of light is lower than or equal to said threshold; and maintaining said movable lens apparatus in a retracted state if said lens cap is detected, so long as said detected amount of light is higher than said threshold, said processor controlling movement of said lens apparatus.

14. The method of claim 13, further comprising the steps of:

accepting a user verification input that the lens cap is removed if said lens cap is detected; and extending said movable lens apparatus upon receipt of said user verification input.

15. The method of claim 13, wherein said detecting is performed by an electronic imaging device of said image capturing device.

16. The method of claim 13, wherein the detecting step comprises the steps of:

measuring a level of light received in an electronic imaging device through said movable lens apparatus and generating a light level measurement;

comparing said light level measurement to a predetermined light threshold; and detecting said lens cap if said light level measurement is greater than said predetermined light threshold.

17. The method of claim 13, wherein the detecting step comprises detecting at least one magnet formed as part of said lens cap.

18. The method of claim 13, wherein the detecting step comprises detecting a switch state of a lens cap detector switch.

19. The method of claim 13, further comprising the step of generating a visual warning message if said lens cap is detected.

20. The method of claim 13, further comprising the step of generating an audible warning message if said lens cap is detected.

* * * * *